United States Patent
Anderson et al.

(10) Patent No.: US 9,516,128 B2
(45) Date of Patent: Dec. 6, 2016

(54) GENERIC REMOTE CONNECTION TO A COMMAND LINE INTERFACE APPLICATION

(75) Inventors: Dale Howard Anderson, Tucson, AZ (US); Jason Lee Peipelman, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1284 days.

(21) Appl. No.: 12/032,846

(22) Filed: Feb. 18, 2008

(65) Prior Publication Data

US 2009/0157884 A1 Jun. 18, 2009

Related U.S. Application Data

(60) Provisional application No. 61/013,444, filed on Dec. 13, 2007.

(51) Int. Cl.
*G06F 15/16* (2006.01)
*H04L 29/08* (2006.01)
*H04L 29/06* (2006.01)

(52) U.S. Cl.
CPC ........... *H04L 67/2823* (2013.01); *G06F 15/16* (2013.01); *H04L 67/10* (2013.01); *H04L 67/42* (2013.01)

(58) Field of Classification Search
CPC ............ H04L 12/2424; H04L 12/2425; H04L 12/5855; H04L 29/06476; H04L 69/16
USPC ................. 709/228, 200, 203, 224
See application file for complete search history.

(56) References Cited

U.S. PATENT DOCUMENTS

| | | | | |
|---|---|---|---|---|
| 4,893,306 A | * | 1/1990 | Chao | H04J 3/247 370/395.1 |
| 5,856,973 A | * | 1/1999 | Thompson | G06T 9/007 348/461 |
| 5,999,979 A | * | 12/1999 | Vellanki | H04L 29/06 348/E5.008 |
| 7,203,742 B1 | * | 4/2007 | Luft et al. | 709/223 |
| 7,302,568 B2 | * | 11/2007 | von Behren et al. | 713/167 |
| 7,360,243 B2 | * | 4/2008 | Krtolica et al. | 726/11 |
| 7,433,300 B1 | * | 10/2008 | Bennett et al. | 370/216 |
| 7,606,868 B1 | * | 10/2009 | Le et al. | 709/211 |
| 2001/0029548 A1 | * | 10/2001 | Srikantan et al. | 709/250 |
| 2002/0049800 A1 | * | 4/2002 | Kobayashi | G06F 17/30899 718/1 |
| 2002/0169881 A1 | * | 11/2002 | Fritsche et al. | 709/229 |
| 2003/0156132 A1 | | 8/2003 | Gn et al. | |
| 2004/0083299 A1 | * | 4/2004 | Dietz et al. | 709/230 |
| 2004/0103175 A1 | | 5/2004 | Rothman et al. | |
| 2004/0179683 A1 | * | 9/2004 | von Behren et al. | 380/44 |
| 2004/0249885 A1 | * | 12/2004 | Petropoulakis et al. | 709/204 |
| 2005/0165826 A1 | * | 7/2005 | Ho et al. | 707/102 |

(Continued)

*Primary Examiner* — El Hadji Sall
(74) *Attorney, Agent, or Firm* — Griffiths & Seaton PLLC (57) ABSTRACT

A method to establish a generic remote connection to a command line interface (CLI) application is provided. A server is implemented. The server is configured with a data input channel, a data output channel, and an error output channel, each connected to the CLI application. A first socket is configured for routing data streams through the data input channel and data output channel of the server. At least one client is implemented. The at least one client is configured with the data input channel, data output channel, and the error output channel.

15 Claims, 5 Drawing Sheets

(56) References Cited

U.S. PATENT DOCUMENTS

| | | | |
|---|---|---|---|
| 2005/0198364 A1* | 9/2005 | Val | H04L 67/2823 709/236 |
| 2006/0026290 A1* | 2/2006 | Pulito et al. | 709/227 |
| 2006/0112219 A1* | 5/2006 | Chawla et al. | 711/114 |
| 2006/0159077 A1* | 7/2006 | Vanecek | 370/360 |
| 2007/0133609 A1* | 6/2007 | Moore | G06F 17/30017 370/484 |
| 2007/0192773 A1* | 8/2007 | McCollum et al. | 719/330 |
| 2008/0021842 A1 | 1/2008 | Pintos et al. | |
| 2008/0114882 A1* | 5/2008 | Christenson | 709/228 |

* cited by examiner

GENERIC REMOTE CONNECTION TO A COMMAND LINE INTERFACE APPLICATION

CROSS-REFERENCE TO RELATED APPLICATION

This application claims the benefit of U.S. Provisional Application No. 61/013,444, filed Dec. 13, 2007.

BACKGROUND OF THE INVENTION

1. Field of the Invention

The present invention relates in general to computers, and more particularly to a system, method, and computer program product for establishing a generic remote connection to a command line interface (CLI) application.

2. Description of the Related Art

In storage controllers, command line interface (CLI) commands are used to configure hardware resources and to utilize existing resources for several different applications. The configuration of hardware resources involves the creation and deletion of resources such as arrays, volumes, volume groups, host connections, and the like. Once the hardware resources are configured, the configured resources can be used for such applications as Copy Services applications (e.g., Flash Copy, Metro Mirror, Global Mirror). In both cases of the configuration of hardware resources and the usage of the existing resources in applications, "primitive commands" and their parameters are used to specify to the CLI the intent of a command request.

While multiple primitive commands may currently be executed in sequence by a CLI, there is currently no mechanism by which multiple primitives commands may be concurrently executed to save computing resources.

SUMMARY OF THE INVENTION

A need exists for a method and computer program product for concurrently executing multiple primitive commands in a command line interface. Accordingly, in one embodiment, by way of example only, a method to establish a generic remote connection to a command line interface (CLI) application is provided. A server is implemented. The server is configured with a data input channel, a data output channel, and an error output channel, each connected to the CLI application. A first socket is configured for routing data streams through the data input channel and data output channel of the server. At least one client is implemented. The at least one client is configured with the data input channel, data output channel, and the error output channel.

In another embodiment, again by way of example only, a system for establishing a generic remote connection to a command line interface (CLI) application is provided. A server is configured with a data input channel, a data output channel, and an error output channel, each connected to the CLI application. A first socket is connected to the server for routing data streams through the data input channel and data output channel of the server. At least one client is configured with the data input channel, data output channel, and the error output channel.

In another embodiment, again by way of example only, a computer program product for establishing a generic remote connection to a command line interface (CLI) application is provided. The computer program product comprises a computer-readable storage medium having computer-readable program code portions stored therein. The computer-readable program code portions include a first executable portion for implementing a server configured with a data input channel, a data output channel, and an error output channel, each connected to the CLI application, a second executable portion for configuring a first socket for routing data streams through the data input channel and data output channel of the server, and a third executable portion for implementing at least one client configured with the data input channel, data output channel, and the error output channel.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

In command line interface (CLI) application programs, the need to use the CLI application may be transient or sporadic. However, stopping and restarting the application according to sporadic need may be resource-intensive and time-consuming. For example, connection times, initialization times, and memory usage as a result of stopping and starting the CLI application may be undesirable. The usability of the CLI application may also be affected. In addition, in some instances only one CLI application program may be instantiated at a given time on a particular server. The user, however, may have a desire to access the program simultaneously in multiple locations.

In both cases described above, it is useful to have a particular CLI application program remain running rather than starting and stopping the application. Modifying the CLI itself to accomplish this task via the use of a subprogram that holds a pool of connections the CLI application may use, or via other means, may involve a moderate amount of programming. In many cases, a user does not have access to the code base of the CLI in order to make changes to the CLI itself. A need exists to have a generic application allowing sporadic communication with a constantly resident CLI application program (either running as a service or a background process).

The present description and following claimed subject matter relate to the implementation of a generic application that allows for sporadic communication with a constantly resident CLI application program. The resident CLI application program may be running as a service or a background process. The generic application allows for such sporadic communication by providing an input and output stream, normally directed at the user's command line, to the user. These input/output (I/O) streams are redirected by a transient program, pursuant to the present description, to the I/O stream of a legacy CLI application program.

Two separate programs may be implemented, which are referred to herein as the "Client" and "Server." The Client and Server may be implemented on a computer system or computer subsystem, such as a storage subsystem, as one skilled in the art will appreciate. Various aspects of the Client and Server may be implemented in hardware, software, firmware, or a combination thereof to suit a particular application. The Client and Server may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Figure 1:
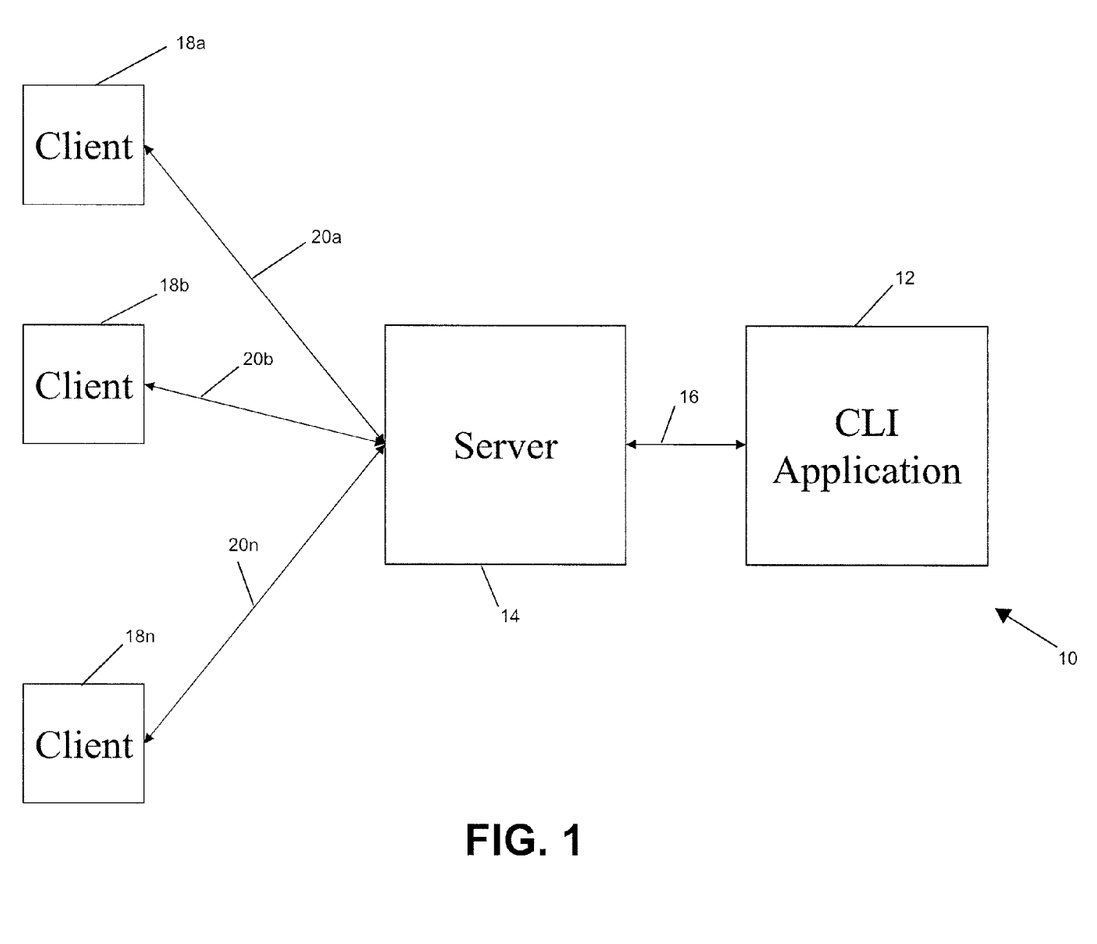
FIG. 1 illustrates a block diagram of exemplary architecture for establishing a generic remote connection to a CLI application.

FIG. 1 illustrates a block diagram of exemplary architecture 10 for establishing a generic remote connection to a CLI application. Architecture 10 depicts the CLI application 12. One Server 14 maintains a connection 16 with the CLI application 12. Both the Server 14 and the CLI application 12 remain running, and can run on a single machine. Multiple Clients 18a, 18b . . . 18n, may connect to the server 14 via connections 20a, 20b . . . 20n. The Client(s) 18a-n may be transient, in that the Client(s) may be started and stopped repeatedly based on a particular need. The Client(s) may, or may not, be run on the same machine as the Server 14 and the CLI application 12.

The Server runs as a separate background process or service, and starts the CLI application. The CLI application has three data streams that the Server will track. These are the data input (e.g., data obtained through the keyboard), the data output (e.g., data sent to a display monitor), and the error output (e.g., error data sent to the display monitor).

The Client may be started and stopped without the overhead associated with the CLI application, and communicates with the Server. When the Client starts, it opens either one or two sockets to the Server. The Server, in turn, connects these sockets to the three data streams of the CLI application. When a user enters data on the Client, the Client sends the data over the sockets to the Server, where it is then redirected to the data input stream of the CLI application. Data from the data and error output streams of the CLI application are redirected through the sockets back to the Client, and in turn, the user.

Figure 2:
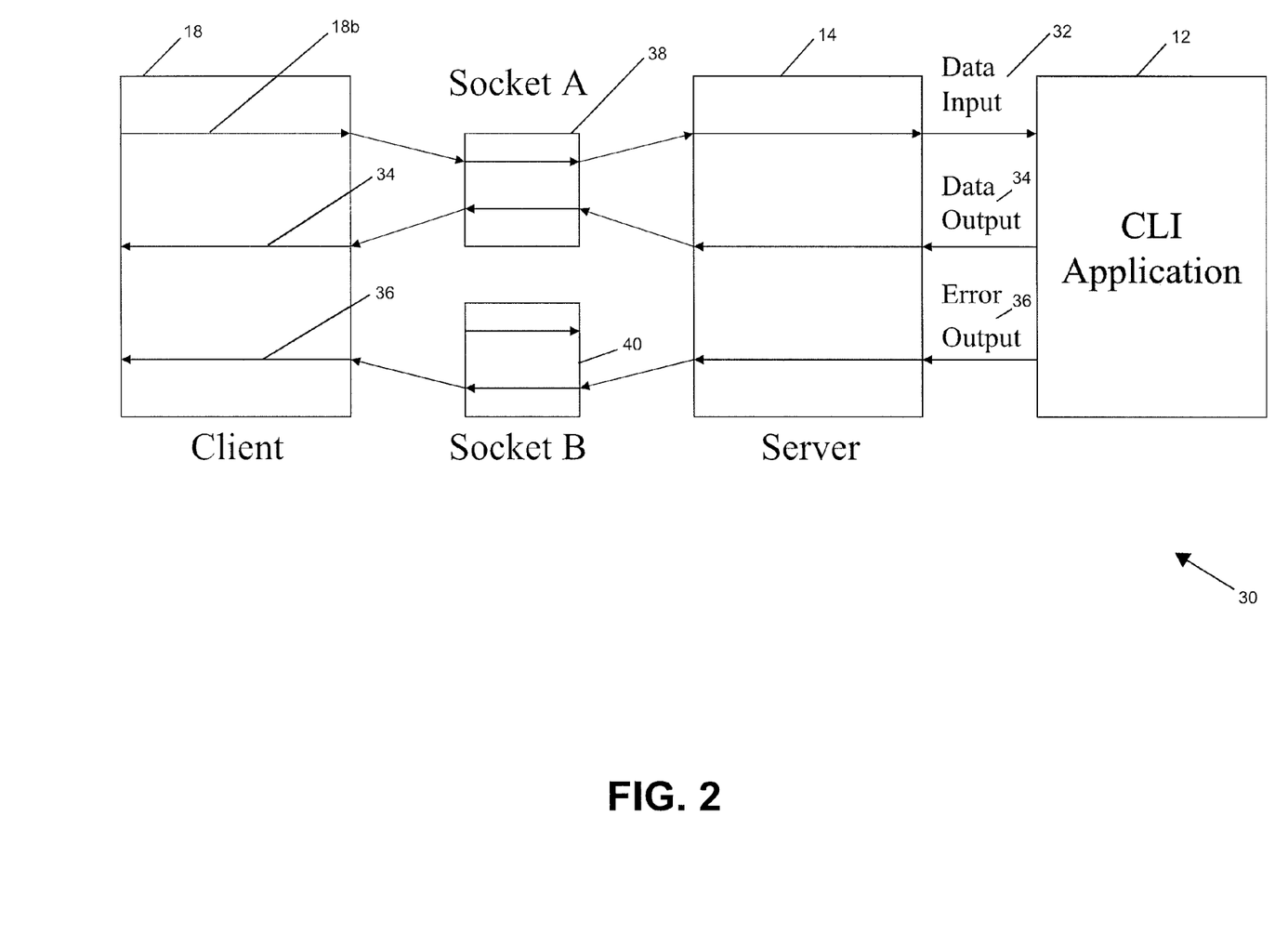
FIG. 2 illustrates a block diagram of an exemplary two socket implementation of the architecture of FIG. 1.

FIG. 2 illustrates a block diagram of an exemplary two socket implementation 30 of the architecture depicted in FIG. 1. Implementation 30 is shown having a single Client 18. However, additional clients 18 may be connected as desired and use a similar configuration. A data input 32 data stream is sent from the Client 18 through a first socket 38 (Socket A), through the Server 14 and received in the CLI application 12. A data output 34 data stream is sent from the CLI application 12 through the Server 14, through the socket 38, and received in the Client 18 and passed to a user. Finally, an error output 36 data stream is sent from the CLI application 12 through the Server 14, through a second socket 40 (Socket B), received in the Client 36 and passed to a user. In the depicted embodiment, the input channel of socket 40 is not utilized. The Server 14 may switch multiple Client socket pairs to CLI data streams as needed. The Server 14 synchronizes socket pairs (open, close, etc.).

If only one socket is used, then a separate technique is used to multiplex the data and error streams onto one socket by the Server. The multiplexed data and error streams are then demultiplexed into separate data streams by the Client. Both the Client and the Server may be written and configured such that multiple Clients may be instantiated and communicate with a single Server. In addition, the hardware, software, firmware, or a combination thereof may be configured to allow the Client and Servers to execute on different machines.

Figure 3:
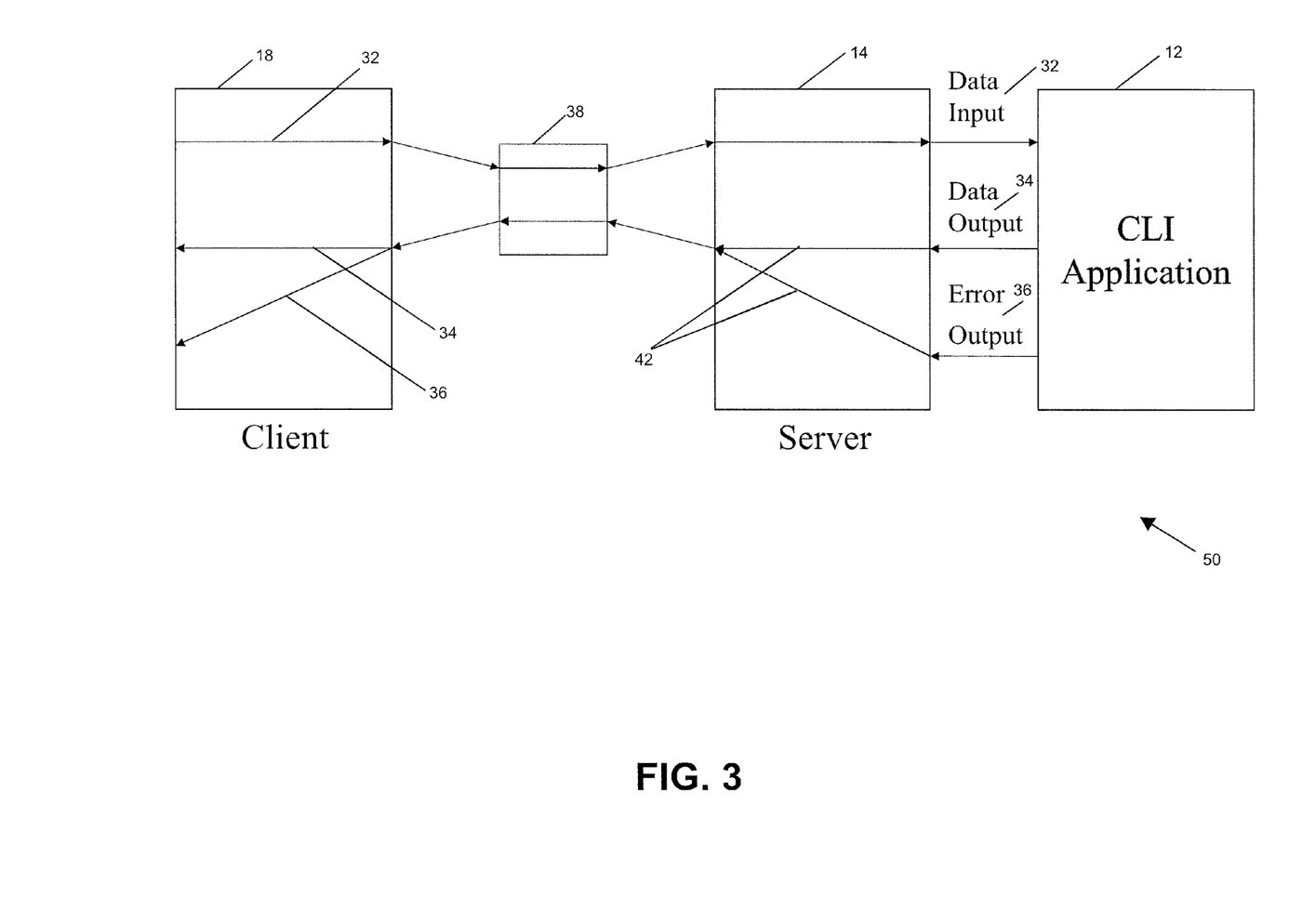
FIG. 3 illustrates a block diagram of an exemplary one socket implementation of the architecture of FIG. 1.

FIG. 3 illustrates a block diagram of an exemplary one socket implementation 50 of the architecture depicted in FIG. 1. Implementation 50 is again shown having a single Client 18. Here again, however, multiple Clients 18 may be utilized with a similar configuration. Similarly to that shown in FIG. 2, the data input 32 data stream is sent through socket 38, through the Server 14 and received in the CLI application 12. In the depicted embodiment, the data output 34 data stream and error output 36 data stream is multiplexed to generate a multiplexed data stream 42, which is passed through a single socket 38. The multiplexed data stream 42 is received in the Client and demultiplexed to regenerate data output 32 data stream and error output 36 data streams. The data streams 34 and 36 are then passed to the user. In one embodiment, the Server 14 may attach a unique header to each data stream for identification. In this way, the data output 34 and error output 36 data streams may be identified by the Client 18 to be demultiplexed. In a manner similar to that shown in FIG. 2, the Server 14 switches multiple Client sockets to respective CLI data streams. Here again, various hardware, software, firmware, or a combination thereof may be utilized in the Client and Server to process and route the data streams as shown.

In the case of a shared CLI session between multiple Clients, commands being issued to the shared CLI session may be serialized such that the complete response for a given Client is received and collected before the next, successive response is submitted.

An exemplary method for establishing a generic remote connection to a CLI application may be implemented in light of the foregoing description. This method may include implementing a Server configured with a data input channel, a data output channel, and an error output channel, configuring a socket or sockets to route data streams through the data channels of the server, and implementing a Client with the data input channel, data output channel, and error output channel.

The method may further include operating and/or configuring the Client to send input data through the socket to the Server, operating and/or configuring the Server to start the CLI application, switch multiple Client sockets to facilitate the data input, and route the input data through the Server to the CLI Application. Additionally, the method may further include operating and/or configuring the Server to multiplex output data and error output data into a single data stream (each data stream identified with a header), route the multiplexed data stream through a socket to the Client, and operating and/or configuring the Client to receive the multiplexed data stream, demultiplex the data stream to regenerate the output data and error output data streams, and pass the output data and error output data to a user.

Figure 4:
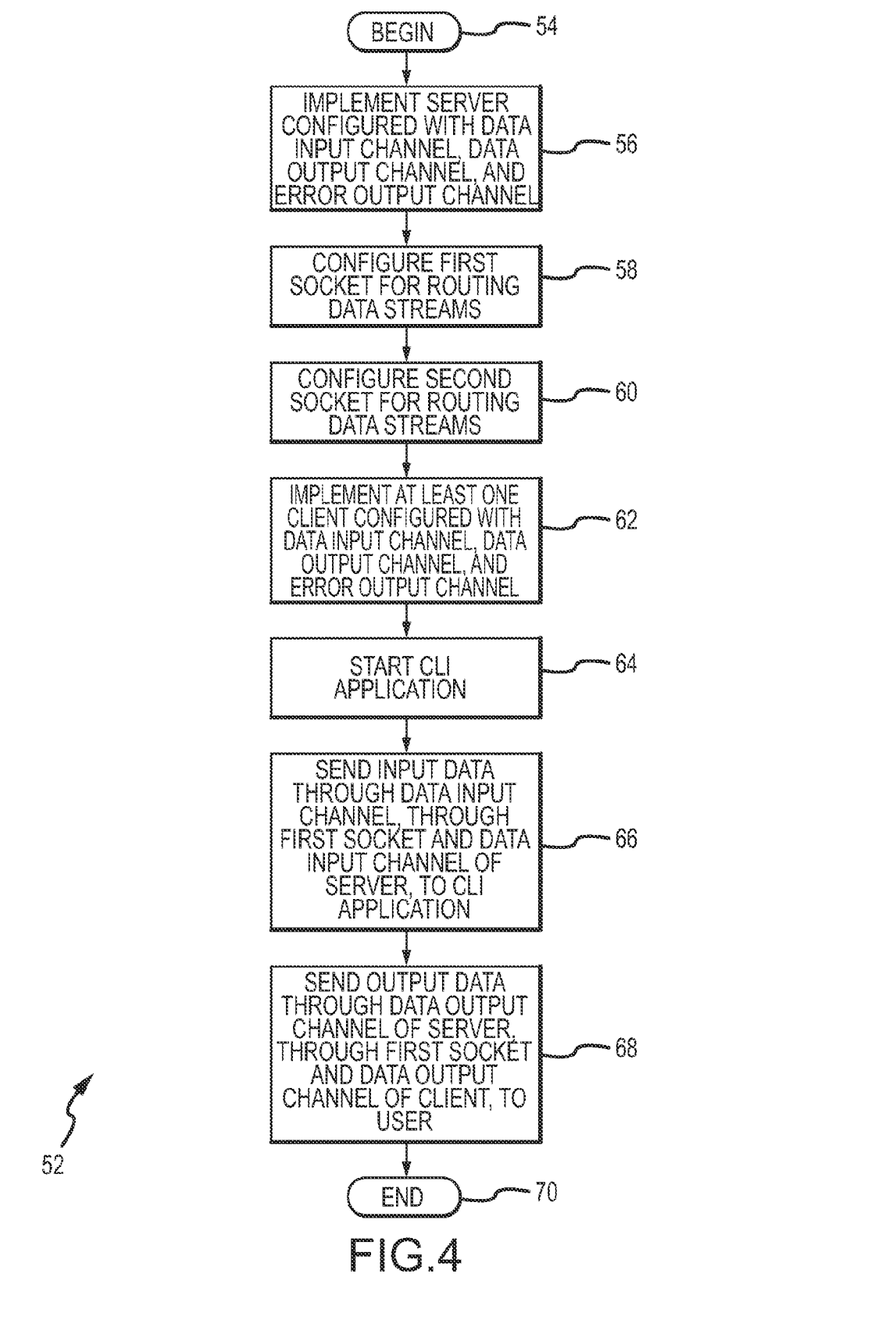
FIG. 4 illustrates a first exemplary method for establishing a generic remote connection to a CLI application.

FIG. 4 illustrates a first exemplary method 52 for establishing a generic remote connection to a CLI application. Method 52 begins (step 54) by implementing a server configured with a data input channel, data output channel, and an error output channel (step 56). A first socket is configured for routing data streams (step 58). A second socket is configured for routing data streams (step 60). At least one client is implemented. The at least one client is configured with a data input channel, a data output channel, and an error output channel (step 62). The CLI application is started (step 64). Input data is sent through the data input channel of the at least one client, through the first socket and data input channel of the server, to the CLI application (step 66). Output data is sent through the data output channel of the server, through the first socket and data output channel of the client, to a user (step 68). The method 52 then ends (step 70).

Figure 5:
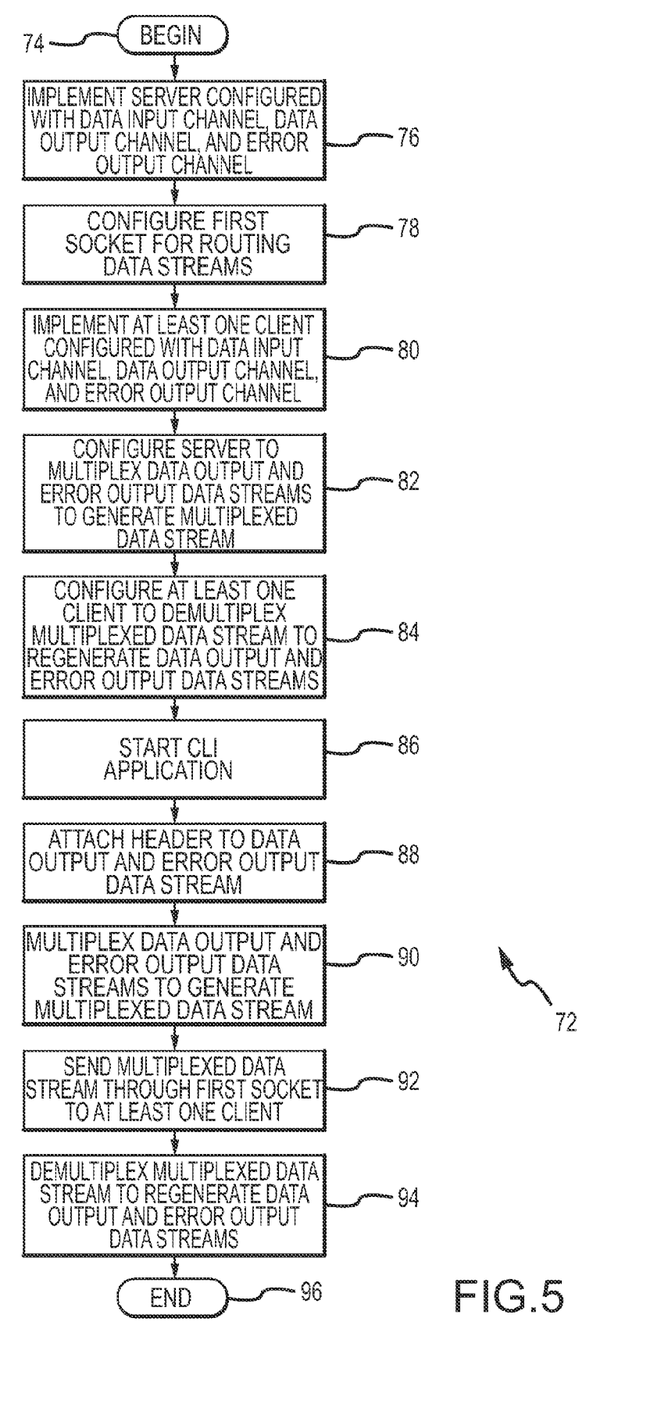
FIG. 5 illustrates a second exemplary method for establishing a generic remote connection to a CLI application.

FIG. 5 illustrates a second exemplary method 72 for establishing a generic remote connection to a CLI application. Method 72 begins (step 74) by implementing a server configured with a data input channel, data output channel, and error output channel (step 76). A first socket is configured for routing data streams (step 78). At least one client configured with a data input channel, data output channel, and error output channel is implemented (step 80). The server is configured to multiplex the data output and error output data streams to generate a multiplexed data stream (step 82). The at least one client is configured to demultiplex the multiplexed data stream to regenerate the data output and error output data streams (step 84). The CLI application is started (step 86). A header is attached to the data output and error output data streams (step 88). The data output and error output data streams are multiplexed to generate a multiplexed data stream (step 90). The multiplexed data stream is sent through the first socket to the at least one client (step 92). The multiplexed data stream is demuliplexed to regenerate the data output and error output data streams (step 94). The method 72 then ends (step 96).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method to establish a generic remote connection to a command line interface (CLI) application for concurrently executing multiple primitive commands in the CLI application and allowing sporadic communication with the CLI application that is a constantly resident CLI application running as one of a service process and a background process, comprising:

configuring and implementing a server configured with a data input channel, a data output channel, and an error output channel, each connected to the CLI application;

multiplexing data output and error output data streams by the server to generate a single multiplexed data stream;

configuring a first socket for routing data streams through the data input channel, the error output channel, and data output channel of the server, wherein the data streams include at least the single multiplexed data stream;

configuring and implementing at least one client configured with the data input channel, data output channel, and the error output channel;

opening the first socket by the at least one client upon starting the at least one client and connecting the first socket by the server to the data streams following the starting of the at least one client;

configuring the at least one client to regenerate the data output and error output data streams that are multiplexed into the single multiplexed data stream;

routing the data streams through the first socket between the server and the at least one client;

serializing commands being issued to a shared CLI session, if the shared CLI session is being shared between a plurality of clients, so that a complete response, for one of the plurality of clients, is received and collected prior to a successive response being submitted;

tracking at least three of the data streams of the CLI application, wherein the data streams are a data input stream, which is data obtained from a keyboard, a data output stream, which is data sent to a display monitor, and an error output stream, which is error data sent to the display monitor;

attaching, by the server, a unique header to each of the data output and the error output data stream that are multiplexed into the single multiplexed data stream for being identified by the at least one client for demultiplexing;

demultiplexing the single multiplexed data stream by the at least one client to regenerate the data output and error output data streams by identifying the data output and the error output data stream using the unique header attached to each of the data output and the error output data stream that have been multiplexed into the single multiplexed data stream by the server.

2. The method of claim 1, further including starting the CLI application by the server.

3. The method of claim 1, further including sending input data through the data input channel of the at least one client, through the first socket and data input channel of the server, to the CLI application.

4. The method of claim 1, further including sending output data through the data output channel of the server, through the first socket and data output channel of the client, to a user.

5. The method of claim 1, further including configuring the server to:

operate as a separate background process or service.

6. The method of claim 1, further including sending the multiplexed data stream through the first socket to the at least one client.

7. A system for establishing a generic remote connection to a command line interface (CLI) application for concurrently executing multiple primitive commands in the CLI application and allowing sporadic communication with the CLI application that is a constantly resident CLI application running as one of a service process and a background process, comprising:

a server configured with a data input channel, a data output channel, and an error output channel, each connected to the CLI application, wherein the server multiplexes data output and error output data streams by the server to generate a single multiplexed data stream;

a first socket connected to the server for routing data streams through the data input channel, the error output channel, and data output channel of the serve, wherein the data streams include at least the single multiplexed data stream r;

at least one client configured with the data input channel, data output channel, and the error output channel;

at least one processor device in communication with and controlling the server and the at least one client;

the at least one client configured for opening the first socket by the at least one client upon starting the at least one client and connecting the first socket by the server to the data streams following the starting of the at least one client;

the at least one client configured to regenerate the data output and error output data streams that are multiplexed into the single multiplexed data stream;

the server and the at least one client configured to route the data streams through the first socket between both the at least one client and the server;

the at least one processor device configured to serialize commands being issued to a shared CLI session, if the shared CLI session is being shared between a plurality of clients, so that a complete response, for one of the plurality of clients, is received and collected prior to a successive response being submitted;

the at least one process server configured for tracking at least three of the data streams of the CLI application, wherein the data streams are a data input stream, which is data obtained from a keyboard, a data output stream, which is data sent to a display monitor, and an error output stream, which is error data sent to the display monitor;

the at least one process server configured for attaching a unique header to each of the data output and the error output data stream that are multiplexed into the single multiplexed data stream for being identified by the at least one client for demultiplexing;

the at least one client configured to demultiplex the single multiplexed data stream by the at least one client to regenerate the data output and error output data streams by identifying the data output and the error output data stream using the unique header attached to each of the data output and the error output data stream that have been multiplexed into the single multiplexed data stream by the server.

8. The system of claim 7, wherein the server is further configured to start the CLI application.

9. The system of claim 7, wherein the server is further configured to:
 operate as a separate background process or service.

10. A computer program product for establishing a generic remote connection to a command line interface (CLI) application for concurrently executing multiple primitive commands in the CLI application and allowing sporadic communication with the CLI application that is a constantly resident CLI application running as one of a service process and a background process, the computer program product comprising a non-transitory computer-readable storage medium having computer-readable program code portions stored therein, the computer-readable program code portions comprising:

a first executable portion for configuring and implementing a server configured with a data input channel, a data output channel, and an error output channel, each connected to the CLI application, wherein the server multiplexes data output and error output data streams by the server to generate a single multiplexed data stream;

a second executable portion for configuring a first socket for routing data streams through the data input channel, the error output channel, and data output channel of the server, wherein the data streams include at least the single multiplexed data stream;

a third executable portion for configuring and implementing at least one client configured with the data input channel, data output channel, and the error output channel;

a fourth executable portion for opening the first socket by the at least one client upon starting the at least one client and connecting the first socket by the server to the data streams following the starting of the at least one client;

a fifth executable portion for configuring the at least one client to regenerate the data output and error output data streams that are multiplexed into the single multiplexed data stream;

a sixth executable portion for routing the data streams through the first socket between the server and the at least one client;

an seventh executable portion commands being issued to a shared CLI session, if the shared CLI session is being shared between a plurality of clients, so that a complete response, for one of the plurality of clients, is received and collected prior to a successive response being submitted;

an eighth executable portion for tracking at least three of the data streams of the CLI application, wherein the data streams are a data input stream, which is data obtained from a keyboard, a data output stream, which is data sent to a display monitor, and an error output stream, which is error data sent to the display monitor;

a ninth executable portion for attaching, by the server, a unique header to each of the data output and the error output data stream that are multiplexed into the single multiplexed data stream for being identified by the at least one client for demultiplexing;

a tenth executable portion for demultiplexing the single multiplexed data stream by the at least one client to regenerate the data output and error output data streams by identifying the data output and the error output data stream using the unique header attached to each of the data output and the error output data stream that have been multiplexed into the single multiplexed data stream by the server.

11. The computer program product of claim 10, further including an eleventh executable portion for starting the CLI application by the server.

12. The computer program product of claim 10, further including an eleventh executable portion for sending input data through the data input channel of the at least one client, through the first socket and data input channel of the server, to the CLI application.

13. The computer program product of claim 10, further including a an eleventh executable portion for sending output data through the data output channel of the server, through the first socket and data output channel of the client, to a user.

14. The computer program product of claim 10, further including an eleventh executable portion for configuring the server to:
 operate as a separate background process or service.

15. The method computer program product of claim 10, further including an eleventh executable portion for sending the multiplexed data stream through the first socket to the at least one client.

* * * * *